United States Patent [19]

Shimada

[11] Patent Number: 5,258,187
[45] Date of Patent: Nov. 2, 1993

[54] FOOD COATINGSTUFF

[76] Inventor: Seinosuke Shimada, 3-5-18, Fukuzumi, Nagaoka, Niigata, Japan

[21] Appl. No.: 860,595

[22] Filed: Mar. 30, 1992

Related U.S. Application Data

[63] Continuation of Ser. No. 587,330, Sep. 24, 1990, abandoned.

[51] Int. Cl.$^5$ .................... A23G 1/00; A23G 3/30
[52] U.S. Cl. .................... 426/3; 426/89; 426/96; 426/291; 426/293; 426/303; 426/660; 426/661; 426/74
[58] Field of Search .................. 426/3-6, 426/74, 660, 89, 96, 291, 293, 303, 618, 661

[56] References Cited

U.S. PATENT DOCUMENTS

| | | | |
|---|---|---|---|
| 3,063,843 | 11/1962 | Hashimoto | 426/303 |
| 3,607,393 | 9/1971 | Gabel et al. | 426/661 |
| 3,622,352 | 11/1971 | Daylor, Jr. | 426/5 |
| 4,238,510 | 12/1980 | Cherukuri et al. | 426/5 |
| 4,250,195 | 2/1981 | Cherukuri et al. | 426/5 |
| 4,254,149 | 3/1981 | Rudolph et al. | 426/5 |
| 4,522,833 | 6/1985 | Sharma | 426/303 |
| 4,663,175 | 5/1987 | Werner et al. | 426/293 |
| 4,769,248 | 9/1988 | Wilkins et al. | 426/291 |
| 4,844,919 | 7/1989 | Szwerc | 426/94 |
| 4,867,989 | 9/1989 | Silva et al. | 426/303 |
| 4,970,084 | 11/1990 | Pirrotta et al. | 426/289 |

FOREIGN PATENT DOCUMENTS

50-2743  1/1975  Japan .................... 426/5

*Primary Examiner*—R. B. Penland
*Attorney, Agent, or Firm*—Finnegan, Henderson, Farabow, Garrett & Dunner

[57] ABSTRACT

Food coatingstuff comprising rice starch and food products obtained by coating or dusting with rice starch. Inorganic food additives like titanium dioxide, calcium carbonate, etc. are not necessary by use of the coatingstuff containing rice starch.

9 Claims, No Drawings

FOOD COATINGSTUFF

This application is a continuation of application Ser. No. 07/587,330 filed Sep. 24, 1990, now abandoned.

BACKGROUND OF THE INVENTION

1. Field of the Invention

This invention relates to food products such as sweets, cakes, confectioneries, etc. obtained by coating or dusting with starch powder, particularly to a sweet coatingstuff for use in chewing gum, chocolate, etc.

2. Description of the Prior Art

In the prior art, sweet coatingstuffs are widely known. They include inorganic compounds like titanium dioxide, calcium carbonate, etc. as well as natural starches like corn starch, wheat starch, tapioca starch and the processed starches thereof. Also mixtures of the natural starches with the inorganic compounds are known in the prior art.

The mixing of inorganic compounds with natural starches is to improve the physical properties of natural starches in the view points of whiteness degree, dispersion, dustability, etc., particularly to improve the whiteness degree of coatingstuff.

However, consumers in these days are inclining to reject an addition of inorganic additives to natural foodstuff, even if the inorganic additives such as titanium dioxide, calcium carbonate, etc. are the authorized food additives.

Further, increasing use of natural food-dyestuff in the field of food industries are also refusing to accept the conventional coatingstuff, because of incompatible whiteness degree for use in the natural dyestuff.

Accordingly, an object of the present invention is to provide a novel food product coatingstuff sharply improved in the whiteness degree without any inorganic additives.

Further object of the invention is to provide a novel food or pharmaceutical coatingstuff having all the desired physical properties such as a pure natural organic material having no unpleasant smell and taste, sharply improved whiteness degree, ultrafine particle size, decreased dustability and improved dispersion.

SUMMARY OF THE INVENTION

According to the present invention, there is provided a novel food coatingstuff consisting of rice starch and the food products coated or dusted with rice starch.

The rice starch according to the present invention includes glutinous rice starch, non-glutinous rice starch and the mixture thereof. Also, the rice starches to be applied for the present invention may be processed either chemically or physically.

Some properties of the rice starches according to the present invention compared with prior coating materials are shown in the following Table 1 and Table 2.

TABLE 1

| Comparison of coating materials | | | | | |
|---|---|---|---|---|---|
| Coating material | Titanium dioxide | Calcium carbonate | Corn starch | Wheat starch | Tapioca starch |
| Category | Inorganic additive | Inorganic additive | Organic material | Organic material | Organic material |
| Unpleasant smell or taste | none | none | yes | yes | none |
| Whiteness | 90.2 | 99.1 | 98.2 | 91.5 | 89.0 |
| degree |  |  |  |  |  |
| Particle size | 0.2~0.4μ | 3~20μ | 6~21μ | 5~40μ | 4~35μ |
| Dustability | negligible | yes | yes | yes | yes |
| Dispersion | no good | good | good | good | good |

TABLE 2

| Properties of rice starches | | | | |
|---|---|---|---|---|
|  | Non-glutinous rice starch | Glutinous rice starch | Soluble non-glutinous rice starch | Soluble glutinous rice starch |
| Unpleasant smell or taste | none | ← | ← | ← |
| Whiteness degree | 103.9 | 102.3 | 101.7 | 102.5 |
| Particle size | 2~8μ | ← | ← | ← |
| Dustability | negligible | ← | ← | ← |
| Dispersion | good | ← | ← | ← |

As seen from the above tables, the rice starch according to the present invention is characterized by the sharply improved whiteness degree, a pure natural organic material without any inorganic additives, no unpleasant smell and taste, ultra-fine particle size and smooth feeling in the mouth.

DESCRIPTION OF THE PREFERRED EMBODIMENTS

The following examples are presented for better understanding of the present invention to those skilled in the art. It is also to be understood that these examples are intended to be illustrative only and are not intended to limit the invention in any way.

EXAMPLE 1

50 kg of small chocolate balls (7 mm in diameter) were supplied to a rotary pan, then rice starches were added thereto 4 times separately, respectively followed by the addition of syrup for coating the chocolate balls. Thus, 2 kg in total amount of rice starch were added under air drying at 25° C. Products were obtained after final coating with natural red syrup, followed by coating with gelatin thereon. The products thus obtained had an extremely clear color due to the improved whiteness of the rice starch.

EXAMPLE 2

100 kg of small chocolate discs (10 mm in diameter and 3 mm in thickness) were supplied to a syrup coating pan rotating at a speed between 10 and 15 rpm, then glutinous rice starches were added thereto 5 times separately, respectively followed by the addition of syrup for forming coated layers on the chocolate discs. Thus, 5 kg in total amount of the rice starch were added under air drying at 25° C. Products were obtained after final coating with natural yellow syrup, followed by coating with dissolved starch thereon. The products thus obtained showed an extremely fine color due to the rice starch.

EXAMPLE 3

100 kg of small chewing gum balls (9 mm in diameter) were supplied to a syrup coating pan rotating at a speed between 20 and 25 rpm, then rice starches were added thereto 5 times separately, respectively followed by the addition of syrup for forming coated layers on the chewing gum balls, the said rice starches being soluble rice starch processed by sodium hypochlorite. Thus, 5 kg in total amount of the rice starch were added under air drying at 25° C. Products were obtained after final coating with synthetic green syrup, followed by coating with dissolved starch thereon. The products had fine clear color.

EXAMPLE 4

50 kg of small chewing gum balls (8 mm in diameter) were supplied to a syrup coating pan rotating at a speed between 15 and 20 rpm, then rice starches were added thereto 5 times separately, respectively followed by the addition of syrup for forming coated layers on the chewing gum balls, the said rice starches being soluble glutinous rice starch oxidized by high test hypochlorite (calcium hypochlorite). Thus, 3 kg in total amount of rice starch were added under air drying at 20° C. Products were obtained after final coating with synthetic blue syrup, followed by coating with gelatin. Thus, clear colored products were obtained.

What is claimed is:

1. A food product consisting essentially of a food having a white coating of powdered rice starch and a colored coating thereon, wherein the rice starch has a particle size of from 2 to 8 microns and a whiteness degree of from 101.7 to 103.9 which is greater than the whiteness degree of titanium dioxide, calcium carbonate, corn starch, wheat starch or tapioca starch.

2. The food product according to claim 1 wherein the rice starch is selected from the group consisting of glutinous rice starch, non-glutinous rice starch, soluble glutinous rice starch, soluble non-glutinous rice starch and mixtures thereof.

3. The food product according to claim 1 also having a final coating of gelatin or dissolved starch.

4. The food product according to claim 1 wherein the food has four or five coatings of said powdered rice starch.

5. A method for preparing a coated food product which comprises:
   (1) coating food with a white powdered rice starch; and
   (2) then applying a colored coating thereon, wherein the rice starch has a particle size of from 2 to 8 microns and a whiteness degree of from 101.7 to 103.9 which is greater than the whiteness degree of titanium dioxide, calcium carbonate, corn starch, wheat starch or tapioca starch.

6. The method according to claim 5 wherein the food product is selected from the group consisting of chocolate and chewing gum.

7. The method according to claim 5 wherein the rice starch is selected from the group consisting of glutinous rice starch, non-glutinous rice starch, soluble glutinous rice starch, soluble non-glutinous rice starch and mixtures thereof.

8. The method according to claim 5 which further comprises applying a final coating of gelatin or dissolved starch.

9. The method according to claim 5 wherein the food product is coated four or five times separately with said powdered rice starch.

* * * * *